(12) United States Patent
Basso et al.

(10) Patent No.: US 7,149,749 B2
(45) Date of Patent: Dec. 12, 2006

(54) METHOD OF INSERTING AND DELETING LEAVES IN TREE TABLE STRUCTURES

(75) Inventors: Claude Basso, Raleigh, NC (US); Jean L. Calvignac, Cary, NC (US); Gordon T. Davis, Chapel Hill, NC (US); Marco Heddes, Shelton, CT (US); Piyush C. Patel, Cary, NC (US); Steven R. Perrin, Raleigh, NC (US); Grayson W. Randall, Cary, NC (US); Sonia K. Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 10/453,245

(22) Filed: Jun. 3, 2003

(65) Prior Publication Data

US 2004/0030714 A1    Feb. 12, 2004

Related U.S. Application Data

(60) Provisional application No. 60/384,978, filed on Jun. 3, 2002.

(51) Int. Cl.
*G06F 17/30* (2006.01)
(52) U.S. Cl. .................. 707/102; 707/100; 707/101
(58) Field of Classification Search ................ 707/100, 707/102, 101
See application file for complete search history.

(56) References Cited

U.S. PATENT DOCUMENTS

| | | | |
|---|---|---|---|
| 5,237,061 A | 8/1993 | Bhattacharya | 544/125 |
| 5,781,769 A | 7/1998 | Weber | 395/557 |
| 5,911,144 A | 6/1999 | Schwartz et al. | 707/206 |
| 5,915,255 A | 6/1999 | Schwartz et al. | 707/206 |
| 5,995,971 A | 11/1999 | Douceur et al. | 707/102 |
| 6,012,061 A | 1/2000 | Sharma | 707/100 |
| 6,041,053 A | 3/2000 | Douceur et al. | 370/389 |
| 6,067,574 A | 5/2000 | Tzeng | 709/247 |
| 6,104,701 A | 8/2000 | Avargues et al. | 370/238 |
| 6,269,407 B1 | 7/2001 | Cink et al. | 709/315 |
| 6,590,898 B1 * | 7/2003 | Uzun | 370/401 |

* cited by examiner

*Primary Examiner*—Jeffrey Gaffin
*Assistant Examiner*—Monica Pyo
(74) *Attorney, Agent, or Firm*—Joscelyn G. Cockburn; William N. Hogg

(57) ABSTRACT

A technique is provided to either insert or delete a leaf in a Patricia tree having a direct table and a plurality of PSCB's which decode portions of the pattern of a leaf in the tree without shutting down the functioning of the tree. A leaf having a pattern is identified as either a leaf to be inserted or deleted. Using the pattern, the tree is walked once to identify the location of the leaf to be deleted or the location where the leaf is to be inserted. If it is a delete operation, the leaf to be deleted is identified and deleted, and any relevant PSCB modified, if necessary. If it is an insert operation, the tree is walked a second time to insert the leaf and reform or create any PSCB in the chain that needs to be reformed or created. The technique also is applicable to inserting or deleting a prefix of a prefix.

6 Claims, 11 Drawing Sheets

An example of a tree with two patterns and its associated NP PSCB.

An example of a tree with two patterns and its associated NP PSCB.

All POssible NP that can be associated with a PSCB. Each pattern has an associate.

Insert a key at an existing PSCB before key is inserted.

Insert at an existing PSCB after key is inserted.

Insert a new PSCB before an
existingPSCB before key is inserted

Insert a new PSCB before an existing PSCB
after key is inserted.

Insert a new PSCB after an existing PSCB before key is inserted

Insert a new PSCB after an existing PSCB after key is inserted.

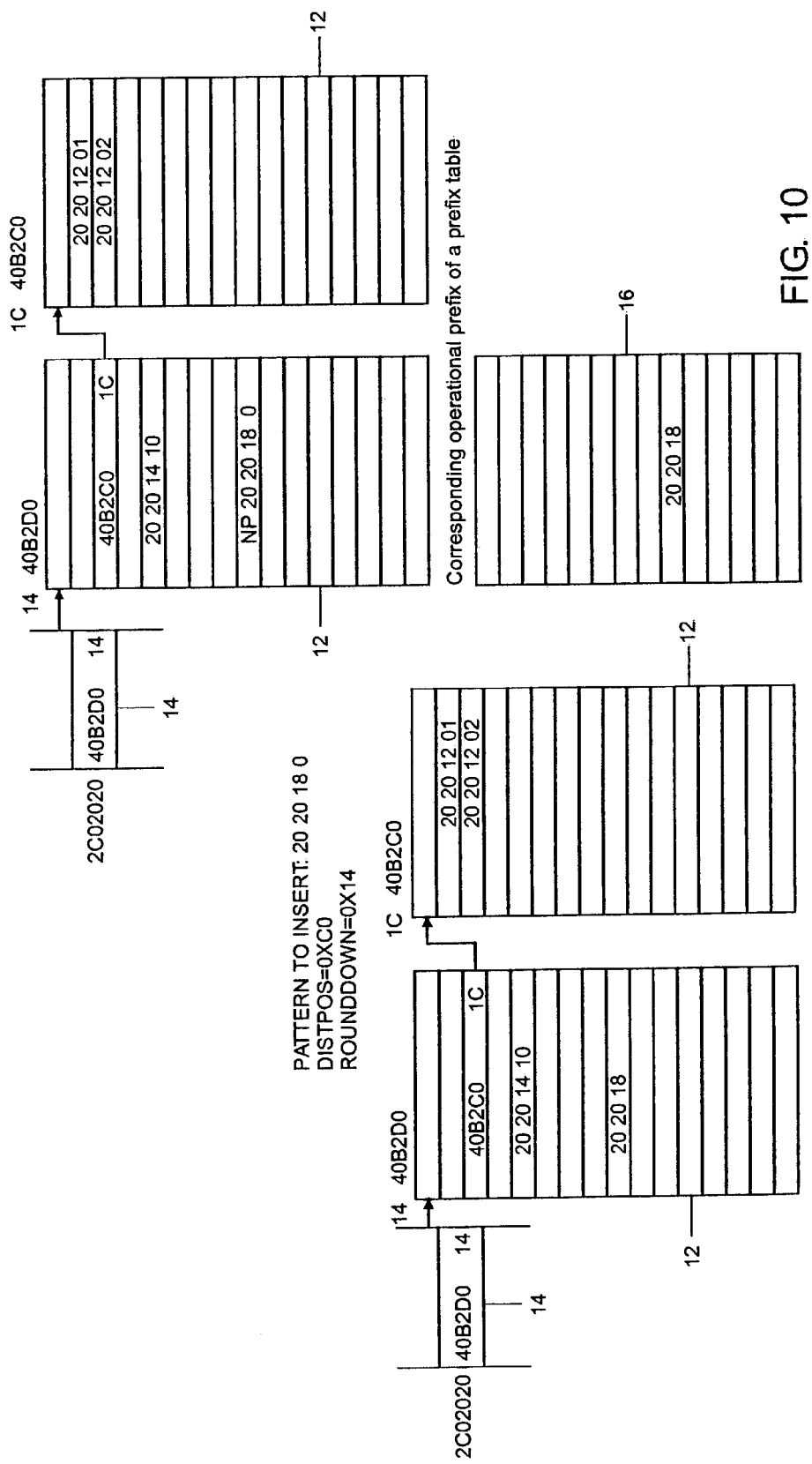

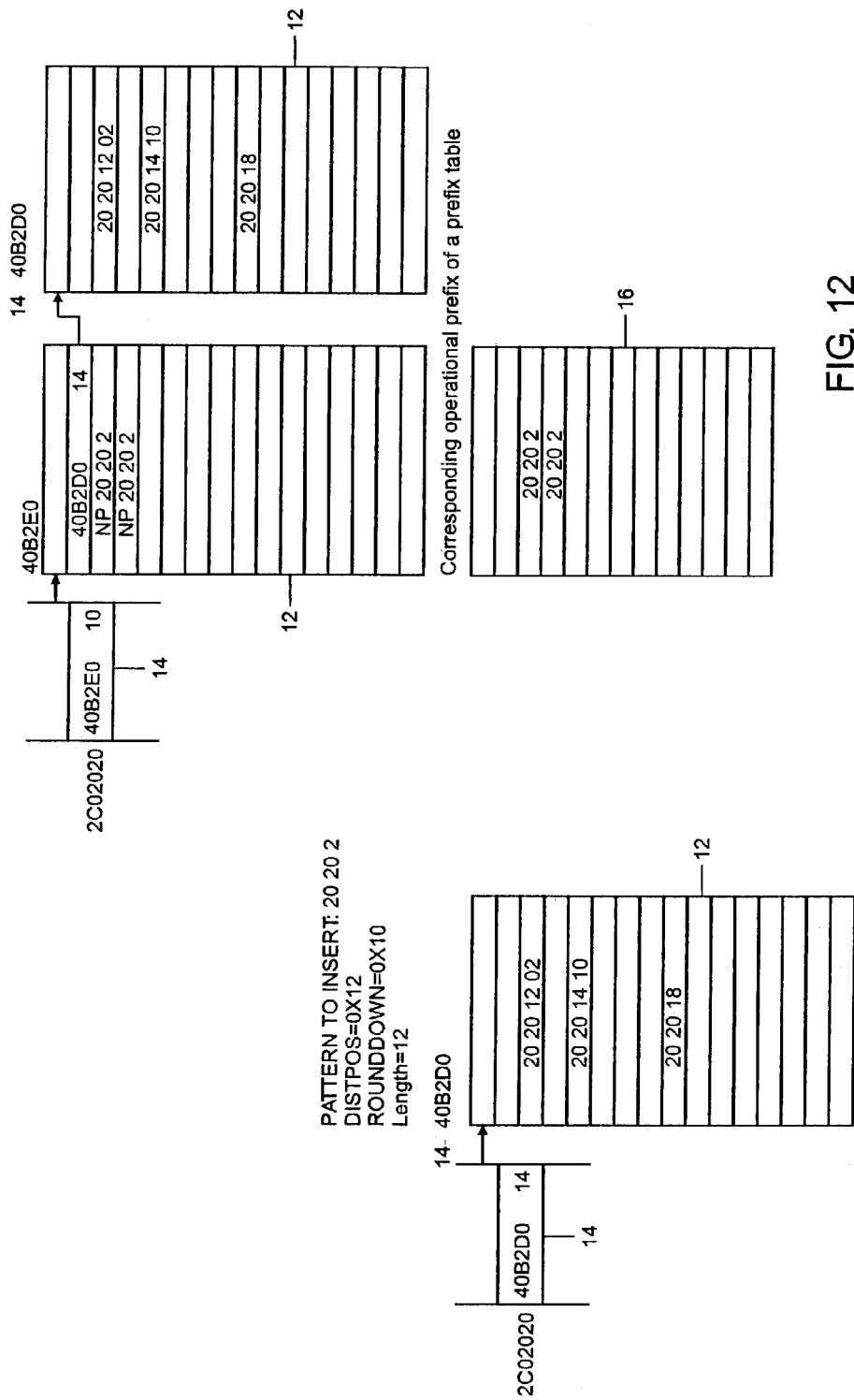

After Leaf has been deleted

Deleting a Leaf caused a PSCB to be collapsed

Deleting a prefix causes 2 PSCBs to be removed.

After prefix is deleted

US 7,149,749 B2

METHOD OF INSERTING AND DELETING LEAVES IN TREE TABLE STRUCTURES

CROSS REFERENCE TO RELATED APPLICATION

Provisional Patent Application Ser. No. 60/384,978, filed Jun. 3, 2002, for "Multi-Bit Patricia Trees" and Utility Patent Application based thereon, Ser. No. 10/448,528, filled May 30, 2003, entitled "Multi-Bit Patricia Trees", which are incorporated herein by reference, describe the operational parts and operation of a Patricia tree. This invention describes an algorithm required to maintain information and tree state to support continuous tree searches, leaf inserts, leaf updates, leaf reads, and leaf deletes.

FIELD OF THE INVENTION

The invention describes how to maintain a consistent and correct Patricia tree while doing leaf operations, i.e. insertion and deletions of leaves, including how to manage a prefix of a prefix (sometimes referred to as "nested prefix" or "bird").

BACKGROUND INFORMATION

A conventional technique for forwarding computer messages to any one of a number of final destinations is to use a pattern of bits to identify the destination of a particular message, and then walk the pattern bits through a Patricia tree structure of a direct table and, if necessary, through one or more Pattern Search Control Blocks (PSCB's). One such technique is shown and claimed in application Ser. No. 10/448,528 filed May 30, 2003, entitled "Multi-Bit Patricia Tress". In this application, the PSCB's are multibit, thus reducing the latency time. However, this problems in updating the Patricia tree. The present invention describes a technique for updating the Patricia tree by inserting and deleting leaves without interrupting the functioning of the Patricia tree.

SUMMARY OF THE INVENTION

According to the present invention, a technique is provided to either insert or delete a leaf in a Patricia tree while maintaining tree integrity without shutting down the functioning of the tree. A pattern of bits is identified as either a leaf to be inserted or deleted. Using the pattern, the tree is walked once to identify the location of the leaf to be deleted or the location where the leaf is to be inserted. If it is a delete operation, the leaf to be deleted is identified and deleted and any relevant PSCB modified, if necessary. If it is an insert operation, the tree is walked a second time to insert the leaf and reform or create any PSCB in the chain that needs to be reformed or created. The technique also is applicable to inserting or deleting a prefix of a prefix, also known as a nested prefix.

BRIEF DESCRIPTION OF THE DRAWINGS

FIG. 2 shows how 4 bits can be decoded to a 30 bit prefix of a prefix table.

FIG. 9 shows a pattern that not the full length but ends on a 4 bit boundary is treated as a leaf pattern and makes the not full length pattern a prefix.

FIG. 10 shows that after the key (2020380) is inserted, this makes the not full length pattern 202018 a prefix.

FIG. 11 shows inserting a pattern whose length is not on a 4 bit boundary.

FIG. 12 shows after the pattern whose length is not a 4 bit boundary is inserted in the History Prefix of a prefix and Search Prefix of a prefix PSCB. Its LCBA address is copied in the real PSCB 12.

DESCRIPTION OF THE PREFERRED EMBODIMENTS

Figure 1:
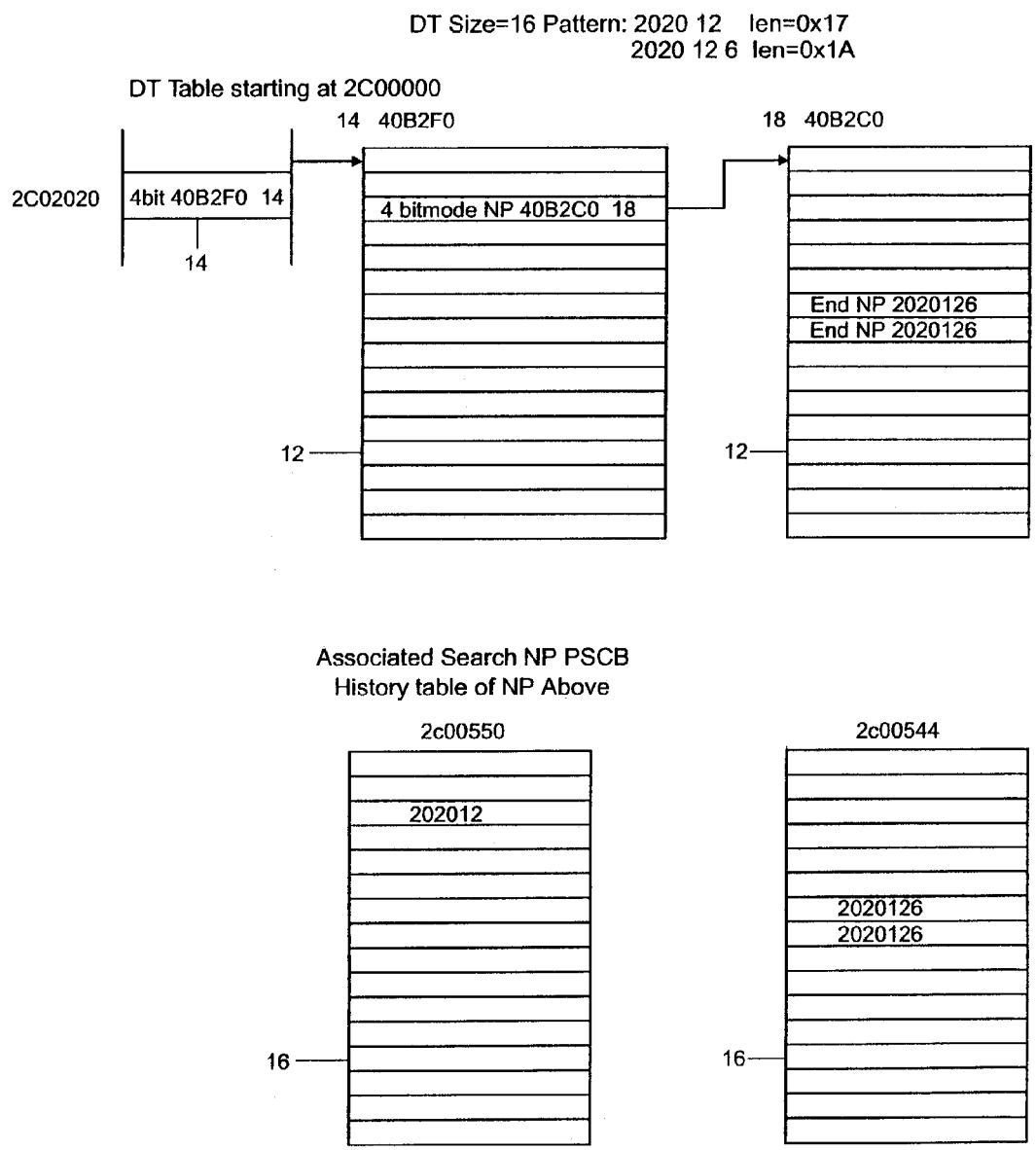
FIG. 1 shows an example of a tree with two patterns and its associated prefix of a prefix PSCB.

In this application, different terms, including abbreviations and acronyms, are used. Table I listed below gives a definition of certain of the terms:

TABLE I

| Term | Definition |
| --- | --- |
| | Terms (includinig abbreviations and acronyms) |
| NPA | Next PSCB address |
| NBT | Next bit to test |
| LCBA | Leaf control block address |
| Bird | Prefix of a prefix or nested prefix |
| Trail End Flag | End of search - entry points to a leaf |
| SRAM | Static random access memory |
| DRAM | Dynamic random access memory |
| DT | Direct table |
| D... | DRAM identifier |
| Mem | Memory |
| LPM | Longest prefix match |
| PSCB | Pattern Search Control Block |
| Distpos | Distinct position |

This invention describes elements and algorithms required to maintain a consistent and correct Patricia tree while search operations may be in progress. The entries in the tree structure are search keys or patterns of X bits in length. In addition, the management of the prefix of a prefix requires only 16 of 30 possible entries to be placed in the operational prefix of a prefix table. The remaining history prefix of a prefix must be maintained to allow for updating of the operational table during insertions and deletions. A prefix of a prefix is a bit pattern that has a length less than another bit pattern, but all the bits of the shorter pattern exactly match the equivalent bits in the longer pattern. For example, two patterns, pattern (A) and pattern (B):

| | |
|---|---|
| (A) 20 20 39 48 | length 29 (decimal) prefix of a prefix |
| (B) 20 20 39 4A | length 32 (decimal) prefix |

In this example, pattern (A) is a prefix of the prefix (B). It has a shorter length (29<32) and all the 29 bits of (A) match the equivalent 29 bits of (B).

(It should be noted that, unless otherwise specified, the coding is in hexadecimal notation.)

This process is necessary to make use of the algorithms described in Provisional Application Ser. No. 60/384,978. The Multibit LPM algorithm uses 4 bit Patricia Tree nodes Pattern Search Control Blocks (PSCB) 12. Each PSCB 12 node holds $2^m$ possible combinations of bits where "m" is commonly 4 or 1. Grouping bits together (in this case 4) minimizes the number of nodes to walk during a search, which increases the search performance. Each PSCB 12 entry contains either a leaf (end of trail) or pointer to another PSCB 12. Prefixes of prefixes are stored in a corresponding slower memory to each PSCB 12. A pattern is broken into groups of 4 bits after the Direct Table (DT) bit size is factored out. Each group of 4 bits has an associated index. The Next Bit to Test (NBT) field in the PSCB 12 or NBT is the index for the next PSCB 12. Each PSCB 12 entry (one of 16) can either point to a next node or the end of the pattern or leaf, i.e. end of trail.

Figure 2:
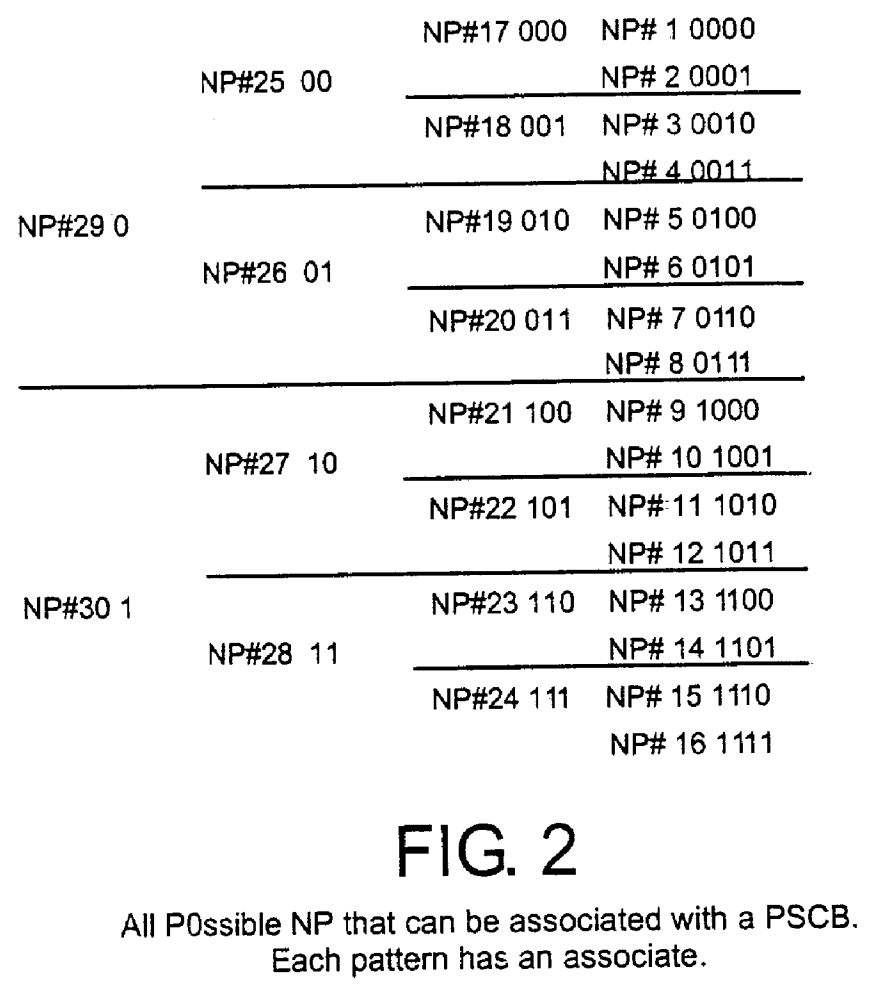

The Next PSCB 12 Address (NPA) 14 in the PSCB points to another node. The end bit in each entry indicates whether the entry contains a leaf or another node. The mode bit indicates whether the next PSCB 12 is a 4 bit PSCB or 1 bit PSCB 12. In the following description, only 4 bit PSCB 12 is discussed. The prefix of a prefix bit indicates whether a prefix whose length ends at this index exists in the corresponding PSCB 12. A prefix of a prefix length can be 1, 2, 3 or 4 bits long at an index. There are 30 possible combinations of a prefix of a prefix associated with one PSCB 12 (see FIG. 2). The hardware looks in the operational prefix of prefix table during searches to find the longest prefix match. The software needs to keep a history prefix of a prefix table to keep track of what prefixes have been inserted and deleted in order to store the longest prefix match in the operational prefix of prefix table. A 4 bit prefix of a prefix will be stored in the operational prefix of prefix table when a longer pattern exists in the tree. If no longer pattern exists, then the 4 bit prefix of prefix is the end of the trail in the main PSCB 12. For example, pattern 20 20 39 48 length 32 will be stored in the operational prefix of prefix table when a longer pattern 20 20 39 48 40 length 40 exists in the corresponding main PSCB 12. Any prefix of a prefix less than 4 will be stored always in the history prefix of a prefix. If a 4 bit prefix of a prefix does not exist, then the longest prefix is stored additionally in the operational prefix of prefix table as well as the corresponding main PSCB 12 at multiple entries (2 entries for 3 bits, 4 entries for 2 bits and 8 entries for 1 bit). The prefix of a prefix map is a word that represents the 30 possible prefix of a prefix combinations. When a prefix of a prefix is inserted, the corresponding prefix of a prefix number gets turned on and off when deleted. FIG. 1 shows an example of a tree with two patterns and its associated history prefix of a prefix NPA 14.

Multibit Insert (in this Case 4 Bits)

This section describes the Multibit Insert Algorithm.

One of the fundamental principles is that an attempt is made to define the tree by only using enough information to distinguish the unique characteristics of each pattern being maintained within the free. Each PSCB 12 represents a set of 4 bits (y bits) which contain distinguishing information between different patterns. The number of PSCB's 12 will be minimized to the number of PSCB's 12 required to represent a set of patterns whenever possible. PSCB's will only exist for bit positions that contain distinguishing information (bits that do not match or length not the same) and that are required to uniquely identify a pattern from any other patent. When searching, one does not look at all the bits of the key, only the bits required to uniquely identify the leaf being searched. By looking at these unique bits 4 bits at a time, one can significantly decrease the search time to find the specific information related to the search key. The tree is walked twice based on the insert key's pattern. The first time through is to find the insert point or the index where the pattern of the new key first differs from the patterns in the tree starting from the left most bit (Distinguishing Position or Distpos). The second time is to modify the closest nodes to change the chaining of the tree.

Walk the Tree Based on the Insert Key

Starting with the Direct Table Entry, skip the number of bits specified in the Direct Table Bit Size starting from the most significant bit of the insert key. The first entry or DT entry will either indicate a leaf address (LCBA) or a next pointer address NPA 14, along with a next bit to test (NPA 14 or NBT). If it is an NPA 14 and NBT entry, take the next four bits of the insert key starting as indicated by the NBT and use the 4 bits as an index to the next PSCB 12 or NPA 14, continue to follow the chain until the entry is at the end of tail bit is set, a leaf address. If the end is an empty entry, find the nearest leaf address by looping through 16 entries of the current PSCB 12. If none of the 16 entries is a leaf address, take the first next pointer address and loop through that PSCB's 16 entries until a leaf is found. A valid tree must have a leaf at the end of the chain. Determine the most significant bit distinguishing position between the found leaf address's pattern in the tree and the insert key.

Find the Insertion Point

The Distpos value indicates where the insert key should be inserted. The Distpos value indicates where two patterns differ. Subtract the DT size from the Distpos value, and then round that value down to a multiple of 4 bits grouping, and that is the insertion point. However, if two patterns are prefixes of each other, then the shorter length becomes the value to be rounded down.

Second Walk to Insert

Walk the tree the second time based on the next bit to test in the tree and the extracted bits from the insert key. If the rounded down insert value is equal to the NBT, then insert the new key at an existing PSCB 12. If the rounded down insert value is less than the NBT, then insert the new key before the next PSCB 12. If the rounded down insert value is greater than the NBT, continue to the next PSCB 12 until there's no more PSCB's. If the rounded down insert value is greater than the last NBT, then there is a need to insert after that PSCB 12.

Figure 3:
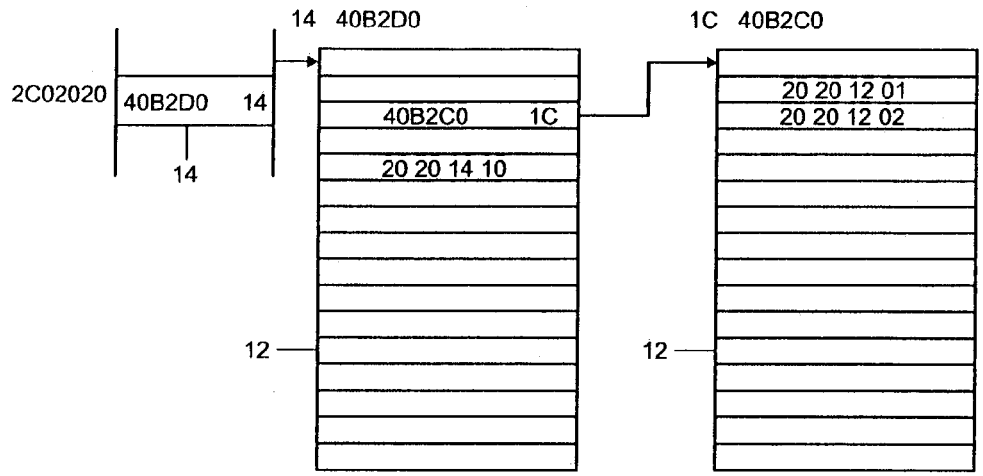
FIG. 3 shows inserting at an existing PSCB, before key is inserted.

FIG. 3 shows an insert a key at an existing PSCB 12, before key is inserted.

Figure 4:
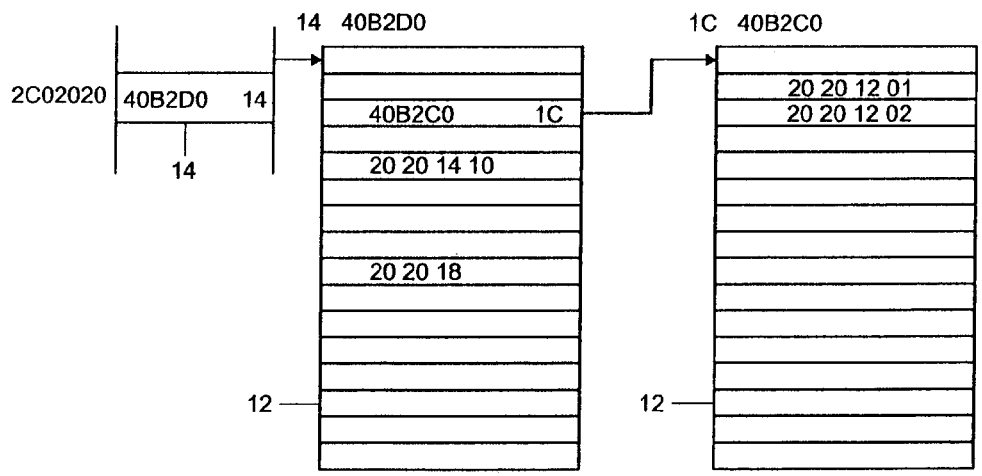
FIG. 4 shows inserting at an existing PSCB, after key is inserted.

FIG. 4 shows inserting at an existing PSCB 12, after key is inserted.

Figure 5:
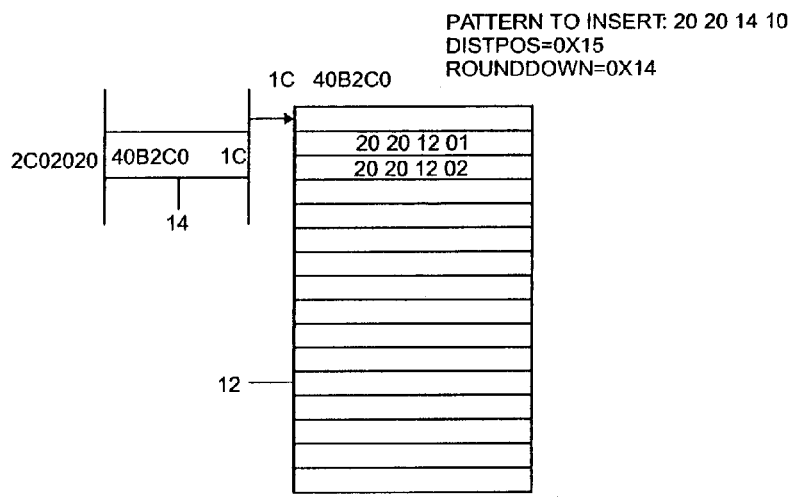
FIG. 5 shows inserting a new PSCB before an existing PSCB, before key is inserted.

FIG. 5 shows inserting a new PSCB 12 before an existing PSCB 12, before key is inserted.

Figure 6:
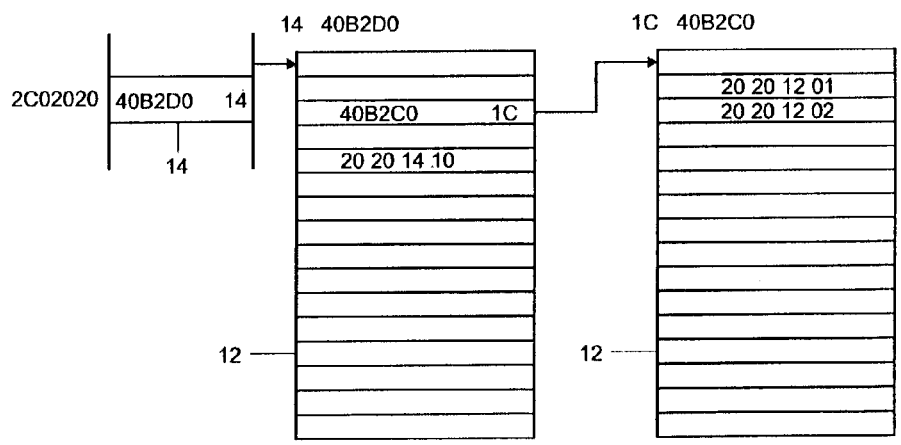
FIG. 6 shows inserting a new PSCB before an exiting PSCB, after key is inserted.

FIG. 6 shows inserting a new PSCB 12 before an exiting PSCB 12, after key is inserted.

Figure 7:
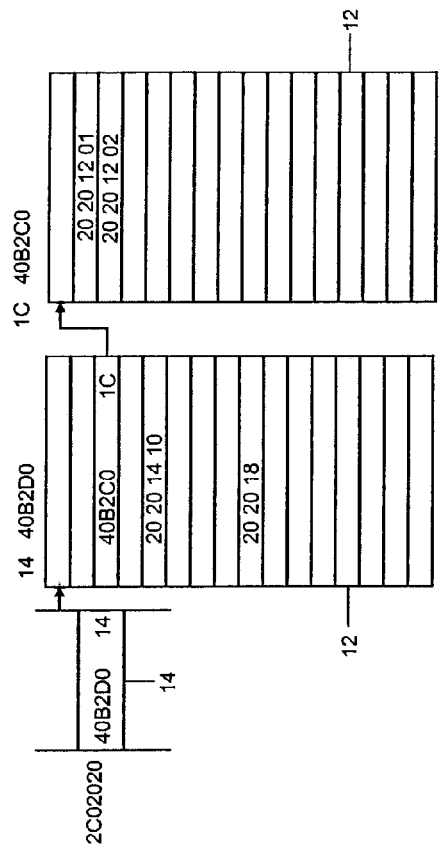
FIG. 7 shows inserting a new PSCB after an existing PSCB, before key is inserted.

FIG. 7 shows inserting a new PSCB 12 after an existing PSCB 12, before key is inserted.

Figure 8:
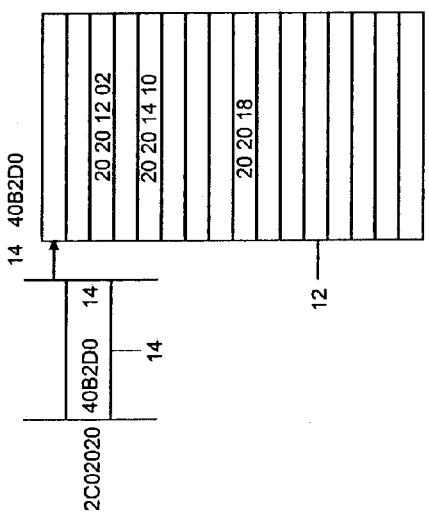
FIG. 8 shows inserting a new PSCB after still existing PSCB, after key is inserted.

FIG. 8 shows inserting a new PSCB 12 after still existing PSCB 12, after key is inserted.

Prefix of Prefix Insert

Table II below shows in the right two columns the operational prefix of prefix table, and in the left two columns the history prefix of prefix table:

TABLE II

| History NP PSCB and Search NP PSCB Associated with Real PSCB | | | |
|---|---|---|---|
| History NP PSCB | History NP PSCB | Search NP PSCB | Search NP PSCB |
| NP#17 and 18 LCBAs | NP#19 and 20 LCBAs | 0000's LCBA 0001's LCBA | 0010's LCBA 0011's LCBA |
| NP#21 and 22 LCBAs | NP#23 and 24 LCBAs | 0100's LCBA 0101's LCBA | 0110's LCBA 0111's LCBA |
| NP#25 and 26 LCBAs | NP#27 and 28 LCBAs | 1000's LCBA 1001's LCBA | 1010's LCBA 1011's LCBA |
| NP#29 and 30 LCBAs | NP Map in Bottom Word | 1100's LCBA 1101's LCBA | 1110's LCBA 1111's LCBA |

| Layout of NP Bit Map, each number is associated with an NP number | | | | | | | | | | | | | | | |
|---|---|---|---|---|---|---|---|---|---|---|---|---|---|---|---|
| x | 30 | 29 | 28 | 27 | 26 | 25 | 24 | 23 | 22 | 21 | 20 | 19 | 18 | 17 | 16 |
|   | 15 | 14 | 13 | 12 | 11 | 10 | 9  | 8  | 7  | 6  | 5  | 4  | 3  | 2  | 1  | X |

Prefixes of prefixes are handled separately. Length of Keys that end on a 4 bit boundary, even if it is not a full pattern, will be treated as a full bit pattern as long as the 4 bit pattern is not a prefix of some other pattern. When another key is inserted and the 4 bit pattern becomes a prefix, it will be treated as any other prefix of prefix. When a prefix of prefix length is less than 4 bits at an index, the prefix of prefix Address or LCBA gets stored in the history prefix of prefix table 16 (also in FIG. 1) and the corresponding prefix of prefix Number is turned on. If this prefix of a prefix is the longest prefix in the PSCB 12, it gets stored in the corresponding operational prefix of a prefix table 16 entries. For example, if prefix of a prefix Number 26 is the only prefix of a prefix received, its LCBA gets copied into the operational prefix of a prefix table entries 4, 5, 6, and 7. Also, the LCBA gets copied into the real PSCB 12 with the prefix of a prefix bit on if those entries are empty or the leaf in the real PSCB 12 entry has a shorter length than the prefix of a prefix length. If the real PSCB 12 entries have a leaf that has a longer length or a Next Pointer Address, it will not get copied with the prefix of a prefix Address.

FIG. 9 shows a pattern that not the full length but ends on a 4 bit boundary is treated as a leaf pattern and makes the not full length pattern a prefix.

FIG. 10 shows that after the key (2020380) is inserted, this makes the not full length pattern 202018 a prefix FIG. 11 shows inserting a pattern whose length is not on a 4 bit boundary.

FIG. 12 shows after the pattern whose length is not a 4 bit boundary is inserted in the history prefix of a prefix and operational prefix of a prefix table. Its LCBA address is copied in the real PSCB 12.

Multibit Delete

When deleting a key, first one searches the key in the tree. If the key is not in the main tree, one makes sure it is not a prefix of a prefix. If it is a prefix of a prefix, search in the prefix of a prefix memory. If a key is not found, then a positive response is returned to confirm that the key is deleted anyway. When a key is found, it gets taken out of the PSCB 12 first. The second step is to try to collapse the PSCB's. One needs to update the PSCB 12 at the earliest point of the tree (left most PSCB 12 as one walks the tree) so not to break the tree search that may be occurring on a different thread or branch.

Walk Tree Based on Delete Key

Starting with the Direct Table Entry, skip the number of bits specified in the Direct Table Bit Size starting from the most significant bit of the delete key. Based on the NBT at each node in the tree, extract the 4 bits from the delete key to find the correct index into the next PSCB 12. If the delete key is a full length key, then by following the tree, the last leaf in the tree should be the leaf to be deleted if the key is in the tree. If the delete key is not a match, then return a positive acknowledgement anyway. If the delete key is a prefix, then it could be encountered in one of two ways: If the length of the delete key is less than or equal to the Next Bit to Test, or if the length of the delete key is less than the last leaf in the tree.

Key to Delete is a Leaf

When the key to be deleted is a found leaf, then the most number of PSCB's to collapse is one. If the prefix of a prefix indicator is on, then need to go to the corresponding history prefix of a prefix table to determine if a prefix length of 4 has been received. If so, it needs to be moved to the real PSCB 12 and removed from the operational prefix of a prefix table. If no other shorter prefix exists, then the prefix of a prefix indicator in the real PSCB 12 can be turned off. If a shorter prefix exists at that PSCB 12, it will be updated in the operational prefix of a prefix table, and the prefix of a prefix indicator in the corresponding real PSCB 12 is left on. If no prefix length of 4, then obtain the next longest prefix and copy it in the real PSCB 12 entry with its address. If the prefix of a prefix indicator is off, then zero the PSCB 12 entry. Loop through all the entries of that PSCB 12, if there is only one entry that is not empty, then move that entry to the previous PSCB 12's entry. Write the previous PSCB 12 and free the old PSCB 12 and leaf found. If there are more than one non-empty PSCB 12 entries, just write the PSCB 12 and free the leaf found.

Figure 13:
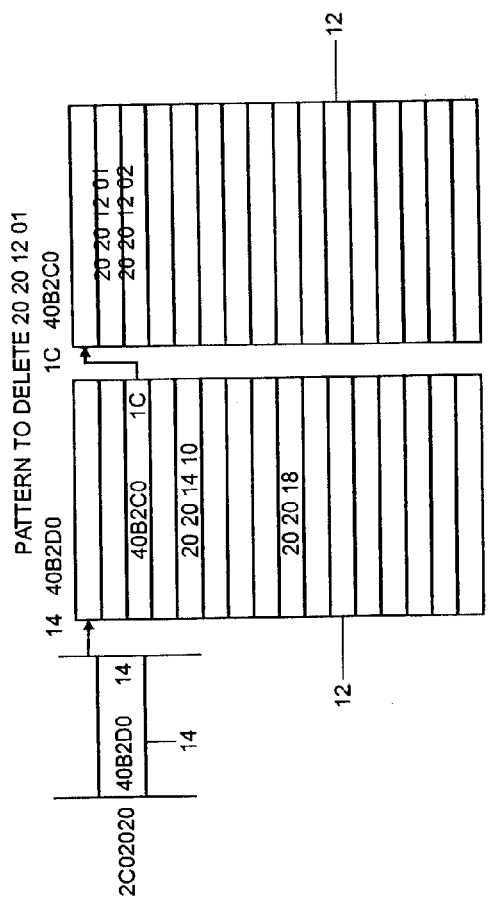
FIG. 13 shows deleting a leaf causes a PSCB 12 to be collapsed.

FIG. 13 shows deleting a leaf causes a PSCB 12 to be collapsed.

Figure 14:
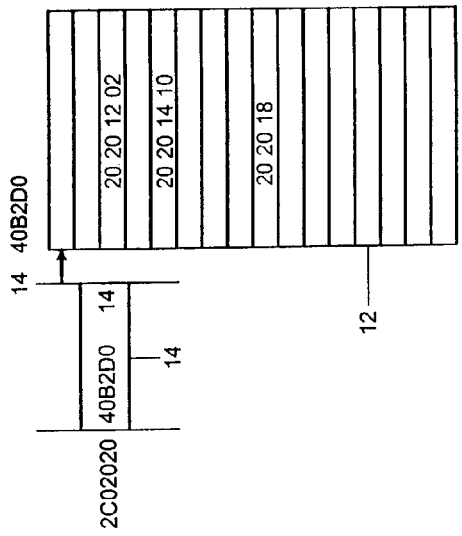
FIG. 14 shows the PSCB 12 after leaf has been deleted.

FIG. 14 shows the PSCB 12 after Leaf has been deleted.

Key to Delete is a Prefix of a Prefix

When the key to be deleted is a prefix of a prefix, then the most number of PSCB's to collapse is two. The reason is a prefix of a prefix length that is not on a multiple of 4 must be stored at the PSCB's index that is rounded down for that prefix length. So when the last prefix is deleted in a PSCB 12 with no other entries, the previous PSCB 12 may contain the only non-zero entry which is the pointer to the PSCB 12 that contained the deleted prefix.

Figure 15:
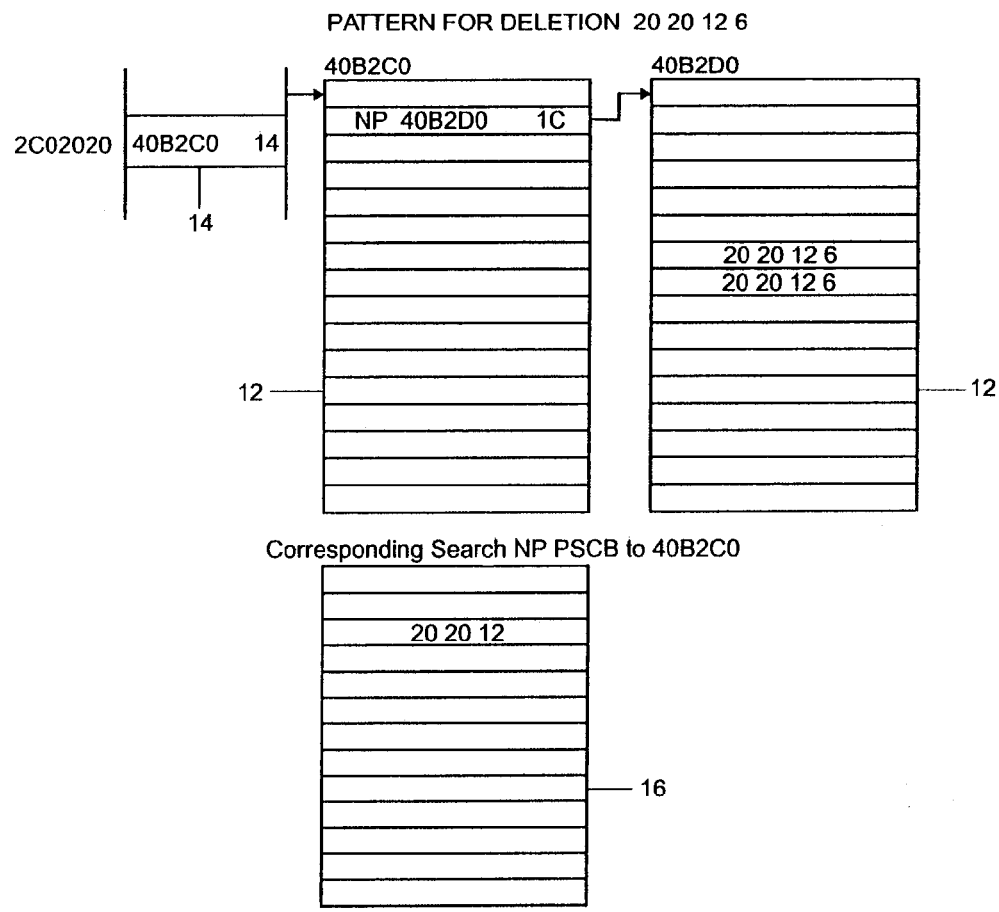
FIG. 15 shows that deleting a prefix of a prefix causes 2 PSCB 12's to be removed.

FIG. 15 shows that deleting a prefix of a prefix causes 2 PSCB's to be removed.

Figure 16:
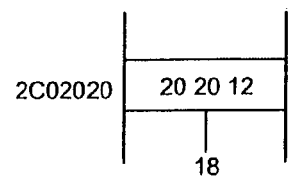
FIG. 16 shows after prefix of a prefix is deleted.

FIG. 16 shows a leaf 18 after prefix of a prefix is deleted.

When deleting a prefix of a prefix, one must first check the prefix of a prefix Map in history prefix of a prefix table 16 to see if the prefix of a prefix exists in the tree. If not found, return a positive acknowledgment. If found, search for the next longest prefix of a prefix that is a prefix of a prefix to be deleted within that PSCB 12. If one exists, then replace the next longest prefix in the entries that the deleted prefix exists in the operational prefix of a prefix table entries and the real PSCB 12 entries. If no next longest prefix match is found, replace with zeros. Once the prefix has been removed from the history prefix of a prefix table, operational prefix of a prefix table and real PSCB 12, then try to collapse the PSCB 12's if possible to a leaf 18.

Figures 17, 18:
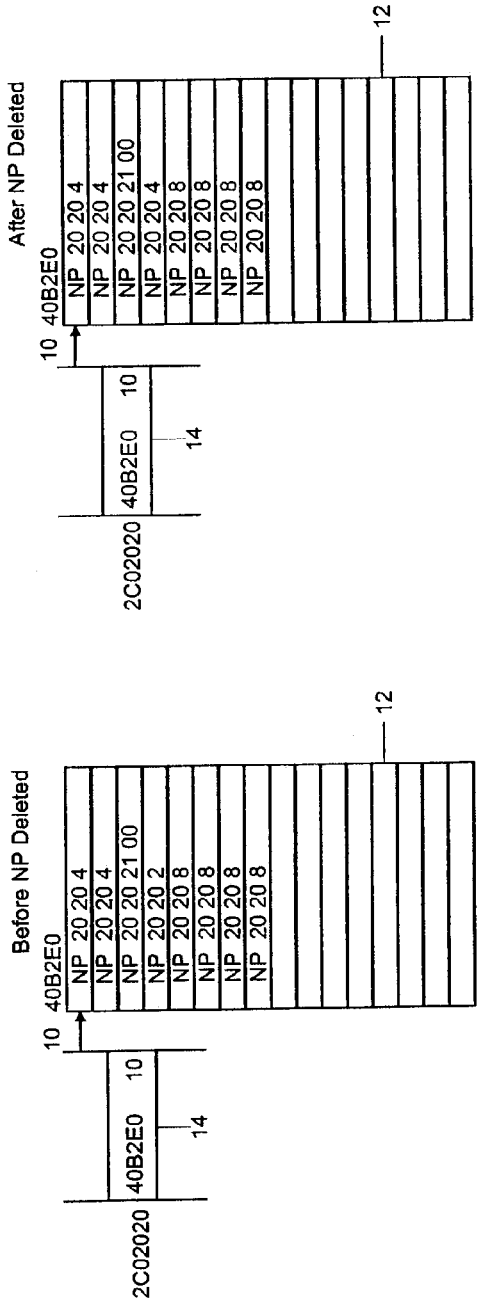
FIG. 17 shows deleting a prefix while the next longest prefix exists.
FIG. 18 shows after the prefix delete for deleting a prefix while the next longest prefix exists.

FIG. 17 shows deleting a prefix while the next longest prefix exists.

FIG. 18 shows after the prefix delete for deleting a prefix while the next longest prefix exists.

Figure 19:
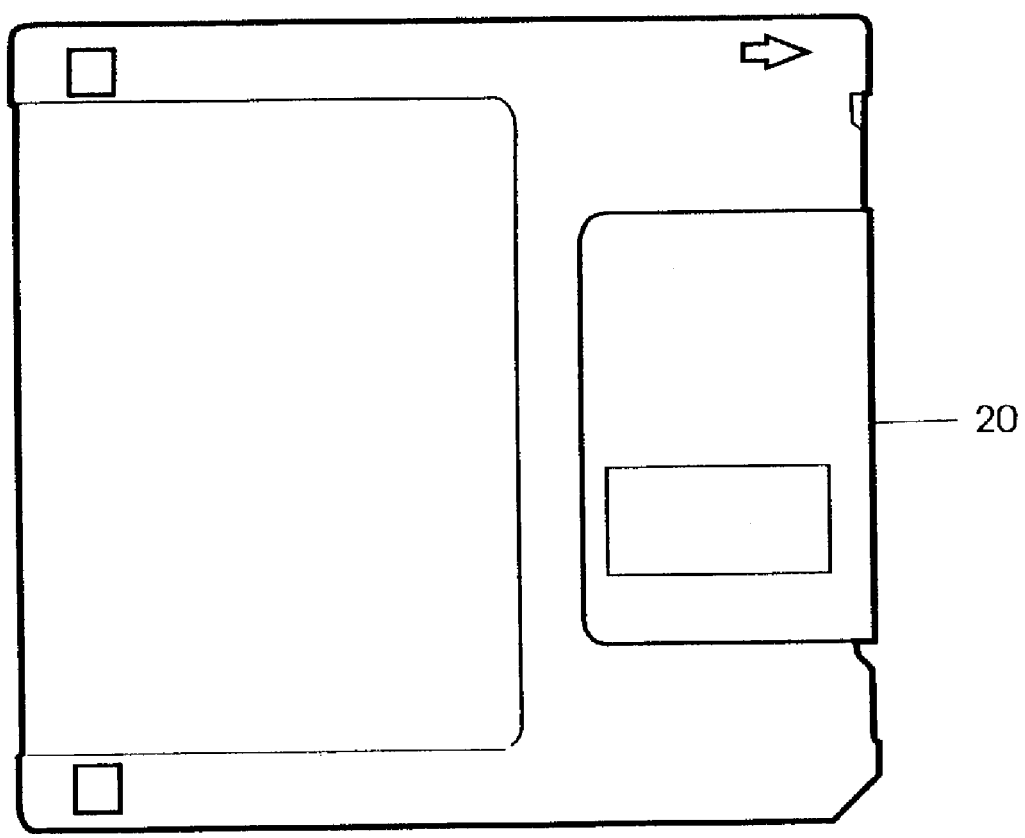
FIG. 19 is an illustration of a computer disc medium on which the program may be stored.

FIG. 19 depicts a computer disc medium 20 having the computer program to perform the method described herein embedded in the medium 20, which program when executed by a computer will perform the method described herein.

While preferred embodiments of the invention have been described herein, variations in the design may be made, and such variations may be apparent to those skilled in the art of computer architecture, systems and methods, as well as to those skilled in other arts. The present invention is by no means limited to the specific programming language and exemplary programming commands illustrated above, and other software and hardware implementations will be readily apparent to one skilled in the art. The scope of the invention, therefore, is only to be limited by the following claims.

What is claimed is:

1. A method of inserting a leaf in a leaf structure having a pattern of x bits, wherein x is a positive integer, in length to a Patricia tree structure which is separate from said leaf structure and with pointers to the leaf structure without interrupting the functioning of the Patricia tree, and wherein said Patricia tree includes a direct table to decode y bits of the pattern, wherein y is a positive integer, and a series of Pattern Search Control Blocks (PSCB's), each configured to decode "m" bits, wherein m is a positive integer, and wherein a search of the leaf to be inserted is comprised of the steps of:

first walking the Patricia tree a first time by decoding the y bits, skipping any bit pattern that is identical, and then decoding any subsequent relevant bits that are different in successive PSCB's to determine the place of insertion of the leaf to be inserted;

if the leaf to be inserted already exists in the table, then updating any information in the existing leaf from the leaf being inserted;

if the leaf being inserted does not already exist in the tree, then determining what modification, if any, is needed of any PSCB, and walking the tree a second time and inserting the leaf to be inserted at the determined place of insertion, and making any modifications to any relevant PSCB that has been determined is required.

2. The invention as defined in claim 1 wherein the leaf is inserted following the direct table.

3. The invention as defined in claim 1 wherein the leaf is inserted following a PSCB.

4. The invention as defined in claim 3 wherein an operational prefix of a prefix table and a history prefix of a prefix table are provided, and wherein the leaf is inserted in the operational prefix of prefix table and the history prefix of prefix table.

5. The invention as defined in claim 3 wherein an operational prefix of a prefix table or a history prefix of a prefix table are provided, and wherein the leaf is inserted in the operational prefix of prefix table or the history prefix of prefix table.

6. An article of manufacture comprising a computer readable medium having a computer readable program embedded in said medium, wherein said computer readable program, when executed on a computer, causes the computer to:

insert a leaf having a patter of x bits, wherein x is a positive integer, in length in a leaf structure to a Patricia tree structure which is separate from said leaf structure and with pointers to the leaf structure without interrupting the functioning of the Patricia tree, and wherein said Patricia tree includes a direct table to decode y bits of a search code, wherein y is a positive integer, and a series of Pattern Search Control Blocks (PSCB's), each configured to decode "m" bits, wherein m is a positive integer, and wherein a search of the leaf to be inserted is comprised of the steps of:

first walking the Patricia tree a first time by decoding the y bits, skipping any bit pattern that is identical, and then decoding any subsequent relevant bits that are different in successive PSCB's to determine the place of insertion of the leaf to be inserted;

if the leaf to be inserted already exists in the table, then updating any information in the existing leaf from the leaf being inserted;

if the leaf being inserted does not already exist in the tree, then determining what modification, if any, is needed of any PSCB, and walking the tree a second time and inserting the leaf to be inserted at the determined place of insertion, and making any modifications to any relevant PSCB that has been determined is required.

* * * * *